United States Patent
Hjertvikrem et al.

(10) Patent No.: US 12,379,048 B2
(45) Date of Patent: Aug. 5, 2025

(54) ELECTRICAL ACTUATOR

(71) Applicant: Vetco Gray Scandinavia AS, Stavanger (NO)

(72) Inventors: Terje Hjertvikrem, Sandnes (NO); Surendra Nadkarni, Stavanger (NO)

(73) Assignee: Vetco Gray Scandinavia AS, Stavanger (NO)

( * ) Notice: Subject to any disclaimer, the term of this patent is extended or adjusted under 35 U.S.C. 154(b) by 127 days.

(21) Appl. No.: 18/002,205

(22) PCT Filed: Jun. 21, 2021

(86) PCT No.: PCT/EP2021/025221
§ 371 (c)(1),
(2) Date: Dec. 16, 2022

(87) PCT Pub. No.: WO2021/259519
PCT Pub. Date: Dec. 30, 2021

(65) Prior Publication Data
US 2023/0220928 A1    Jul. 13, 2023

(51) Int. Cl.
*F16K 31/04*     (2006.01)
*F16K 37/00*     (2006.01)
*E21B 34/00*     (2006.01)

(52) U.S. Cl.
CPC .......... *F16K 37/0041* (2013.01); *E21B 34/00* (2013.01); *F16K 31/04* (2013.01)

(58) Field of Classification Search
None
See application file for complete search history.

(56) References Cited

U.S. PATENT DOCUMENTS

| | | | |
|---|---|---|---|
| 8,600,566 B1 | 12/2013 | Longo | |
| 8,947,242 B2* | 2/2015 | Kucera | F23N 1/005 73/40 |
| 10,221,680 B2* | 3/2019 | August | E21B 33/0355 |
| 2010/0026234 A1 | 2/2010 | Stale et al. | |
| 2013/0154841 A1 | 6/2013 | Kucera | |
| 2015/0022326 A1 | 1/2015 | Baxter | |
| 2017/0191681 A1 | 7/2017 | Rosca et al. | |
| 2017/0254183 A1 | 9/2017 | Vasques et al. | |
| 2017/0306715 A1 | 10/2017 | Pedersen et al. | |

(Continued)

FOREIGN PATENT DOCUMENTS

| | | |
|---|---|---|
| DE | 102004053200 A1 | 5/2006 |
| EP | 3 115 666 | 1/2017 |
| WO | 2016/185235 | 11/2016 |

OTHER PUBLICATIONS

Office Action mailed Jan. 22, 2021 in corresponding NO Application No. NO 20200732 (and English translation).

*Primary Examiner* — K. Wong
(74) *Attorney, Agent, or Firm* — Hogan Lovells US LLP

(57) ABSTRACT

The present invention concerns an electrical actuator for a valve and a method of controlling a valve, using the electrical actuator. The electrical actuator includes an electronics chamber, including a control unit and a utility chamber, including at least one sensor unit. Each sensor unit includes a sensor. A penetration plate separates the electronics chamber and the utility chamber. Each sensor unit in the utility chamber is configured to wirelessly communicate a data signal, obtained by the sensor, to the control unit.

20 Claims, 4 Drawing Sheets

(56) References Cited

U.S. PATENT DOCUMENTS

| | | |
|---|---|---|
| 2018/0045039 A1 | 2/2018 | August |
| 2018/0363801 A1 | 12/2018 | Prajzner et al. |
| 2019/0195389 A1 | 6/2019 | Banzhaf |
| 2019/0203851 A1 | 7/2019 | Kovacs et al. |

* cited by examiner

ELECTRICAL ACTUATOR

TECHNOLOGICAL FIELD

The present invention concerns electrical actuators for valves, particularly, actuators for valves in subsea hydrocarbon extraction environments. The present invention also concerns a method of controlling a valve, particularly, controlling a valve in a subsea hydrocarbon extraction environment.

BACKGROUND

A typical electrical actuator for a valve, shown in FIG. 1, is divided into an electronics chamber 1 and a utility chamber 2, separated by a penetration plate 3. The utility chamber includes a motor or gearbox (not shown). Contact pins 3a extend through the penetration plate 3, to provide power to the motor or gearbox. The penetration plate 3 may be configured to withstand large pressure differences between the electronics chamber 1 and the utility chamber 2. For instance, for subsea applications, the pressure may be up to 300 bar in the utility chamber 2, whereas there may be atmospheric pressure, 1 bar, in the electronics chamber 1.

In order to facilitate operation of the electrical actuator, one or more sensor units 4, each comprising a sensor, are located in the utility chamber 2. Exemplary sensors are pressure transducers, temperature sensors, position sensors, oil level sensors or seawater ingress sensors. Each sensor unit 4 is connected with the electronics chamber 1 by connection means. The connection means include at least two power wires and one data transfer wire (not shown), per sensor unit 4. The wires extend from the sensor unit 4 through the utility chamber 2 to the penetration plate 3. The connection means also include sensor contact pins 3b, embedded in the penetration plate 3 and extending from the utility chamber side to the electronics chamber side of the penetration plate 3. On the utility chamber side, sensor contact pins 3b are connected to power wires and data transfer wire(s). On the electronics chamber side, sensor contact pins 3b are connected to further elements, such as a control unit (not shown).

Due to the presence of apertures, in which the sensor contact pins 3b are installed, the penetration plate 3 is locally structurally weakened at the location of the sensor contact pins 3b. The thickness of the penetration plate must therefore be increased with an increasing number of sensor contact pins 3b, in order to maintain sufficient structural integrity to withstand the aforementioned pressure difference. An increased thickness of the penetration plate 3 results in an undesirable weight-increase and a corresponding increase in both cost and difficulty of handling during production, assembly and installation.

Another disadvantage of the known configuration is that the power wires and data wire extending from each sensor unit 4 located in the utility chamber 2 must be routed through the utility chamber 2. As the utility chamber 2 includes a motor or gearbox with a complex assembly of moving parts, the routing of wires therethrough is a difficult task. Therefore, leading wires through the utility chamber forms a complicating factor during actuator design, production and assembly.

Consequently, there exists a clear need to provide an improved electrical actuator having a simplified configuration while maintaining a lower weight, thereby resulting in an electrical actuator design, assembly, production and installation that is simpler to handle and has lower costs.

SUMMARY

The present invention concerns an electrical actuator for a valve, where the electrical actuator comprises an electronics chamber comprising a control unit, a utility chamber comprising at least one sensor unit including a sensor and a penetration plate separating the electronics chamber and the utility chamber; each sensor unit is configured to wirelessly communicate a data signal, obtained by the sensor, to the control unit. The invention also concerns a valve for a subsea hydrocarbon extraction environment, provided with an electrical actuator according to the invention. Finally, the invention concerns a method of controlling a valve, using an electrical actuator according to the invention, comprising monitoring one or more physical quantities in the utility chamber with the at least one sensor unit;

wirelessly communicating data signals, resulting from said monitoring, from the at least one sensor unit to the control unit; and controlling the valve based on the data signal received by the control unit controlling a valve, particularly, a valve in a subsea hydrocarbon extraction environment.

DETAILED DESCRIPTION

Figure 1:
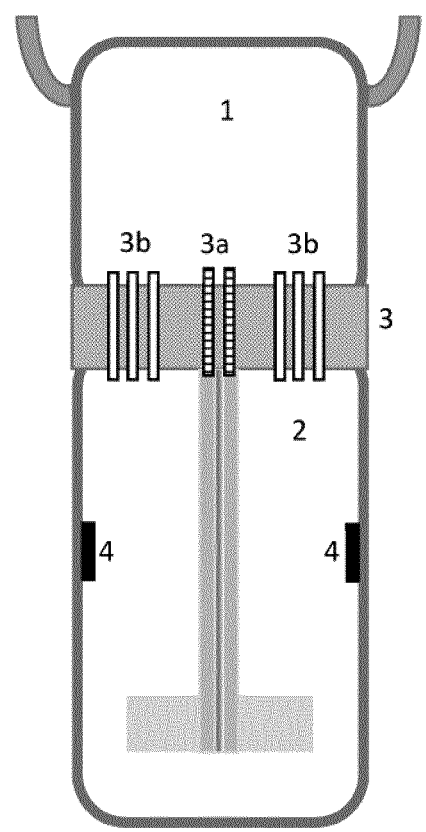
FIG. 1 is a schematic cross-section of a known electrical actuator.
Figure 2:
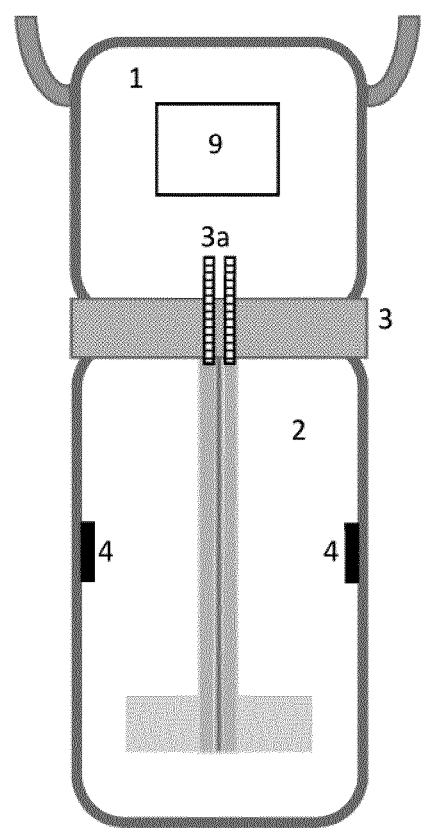
FIG. 2 is a schematic cross-section of an electrical actuator according to the invention.

FIG. 2 shows a schematic representation of an electrical actuator according to the invention. The electrical actuator includes an electronics chamber 1, a utility chamber 2 and a penetration plate 3, separating the electronics chamber 1 and the utility chamber 2. One or more sensor units 4 are located in the utility chamber 2. The one or more sensor units are configured to communicate wirelessly with a control unit 9, located in the electronics chamber 1. Each sensor unit 4 is configured to monitor a physical quantity in the utility chamber 2, such as temperature, pressure, oil level or the presence of sea water. Two sensor units of the same type may be provided in the utility chamber 2, where one sensor unit serves as a back-up for the other sensor unit or where each sensor unit is configured to monitor a different part of the utility chamber.

Figure 3:
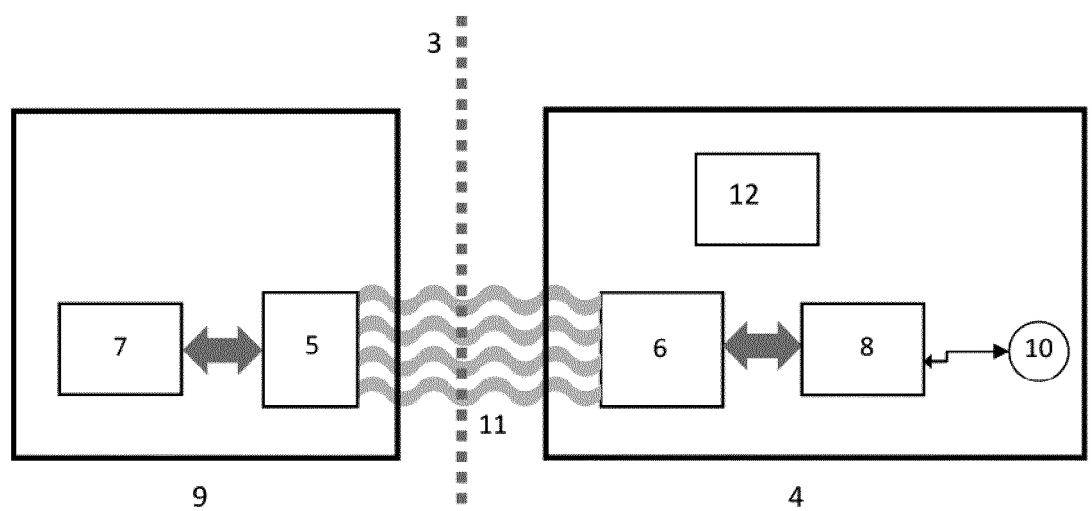
FIG. 3 is a detailed schematic representation of an electrical actuator according to a first embodiment of the invention.

FIG. 3 shows a more detailed schematic configuration of the electrical actuator according to the invention. A control unit 9, located in the electronics chamber 1, comprises a first transceiver 5 and a controller 7. The controller 7 is configured to retrieve a data signal, received by the first transceiver 5. Each sensor unit 4, located in the utility chamber 2, comprises a second transceiver 6, a digital signal processing unit 8, a sensor 10 and a battery 12.

The sensor 10 may, for example, be a pressure transducer, a temperature sensor, an oil level sensor or a sensor for detecting ingress of seawater. The sensor 10 is connected to and controlled by the digital signal processing unit 8. The digital signal processing unit 8 is configured to collect a data signal from the sensor 10, to process the collected data signal and to convey the processed data signal to the second transceiver 6. The second transceiver 6 is configured to communicate the processed data signal wirelessly to the corresponding first transceiver 5, located in the control unit 9 in the electronics chamber 1. Wireless data communication 11 takes place through the utility chamber 2 and across the penetration plate 3, into the electronics chamber 1. The controller 7 of the control unit 9 is configured to retrieve and process the data signal received by the first transceiver 5.

Wireless data communication is preferably by means of ultrasonic data communication. When utilizing ultrasonic data communication, the first transceiver 5 located in the electronics chamber 1 and the second transceiver 6 located in the utility chamber 2 are ultrasonic transceivers. When multiple sensor units 4 are present in the utility chamber 2, each sensor unit 4 is configured for ultrasonic data communication with the control unit 9 at a different frequency. Thereby, signal interference between different sensor units is avoided. In this case the control unit 9 may include a separate first receiver 5 for each sensor unit 4, or one first receiver 5 configured to communicate with multiple sensor units 4.

The battery 12 provides power to the second transceiver 6, the digital signal processing unit 8 and the sensor 10 in the sensor unit 4. Thereby, the battery 12 allows autonomous operation of the sensor unit 4, such that no wires for power supply from the electronics chamber 1 to the sensor unit 4 are needed. The battery 12 has a long lifetime, preferably 10 years or more, and may be a lithium-ion battery. Additionally, an optional back-up battery (not shown) may be included in the sensor unit 4. The back-up battery guarantees continued operation of the sensor unit 4, even if the battery 12 is exhausted or malfunctioning.

The digital signal processing unit 8 may be a low power digital signal processing unit, in order to reduce power consumption and extend the lifetime of the battery 12. The low power digital signal processing unit may be configured for semi real-time monitoring, during which data signal collection from the sensor 10 by the digital signal processing unit 8 takes place periodically, instead of continuously. The digital signal processing unit 8 mainly resides in sleep mod 3, during which power consumption may be on the order of a few nano amperes. At regular intervals the digital signal processing unit 8 wakes up, collects a data signal from the sensor 10, processes the data signal and conveys the data signal to the second transceiver 6, before re-entering sleep mode. The time intervals between data signal collection, during which the digital signal processing unit 8 is in sleep mode, may be 10 seconds or more, depending on actuator operating conditions.

By utilizing a battery 12 and wireless data communication 11, no wires extend from the sensor unit 4 to the electronics chamber 1. Consequently, no sensor contact pins extending through the penetration plate 3 are required for the one or more sensor units 4 located in the utility chamber 2. Thereby, the thickness of the penetration plate 3 can be reduced, saving weight and lowering production costs, assembly costs and installation costs. Furthermore, due to the absence of wires, a sensor unit 4 can be located at previously inaccessible positions in the utility chamber 2. For instance, in a known actuator, passing of wires through a gearbox in the utility chamber is not possible due to the presence of moving parts, with which the wires would interfere. Therefore, sensor unit placement within the gearbox is not possible for known actuators, relying on wires for power supply and data communication. On the contrary, in the electrical actuator according to the invention, a sensor unit can be placed in the gearbox, as power supply and data communication are no longer dependent on the routing of wires through the utility chamber. An advantage of the electrical actuator according to the invention is therefore that the temperature in the gearbox may now be monitored. Furthermore, sensor units can even be located on a rotating part, as the sensor is no longer dependent on physical connections for power and or data transmission.

Figure 4:
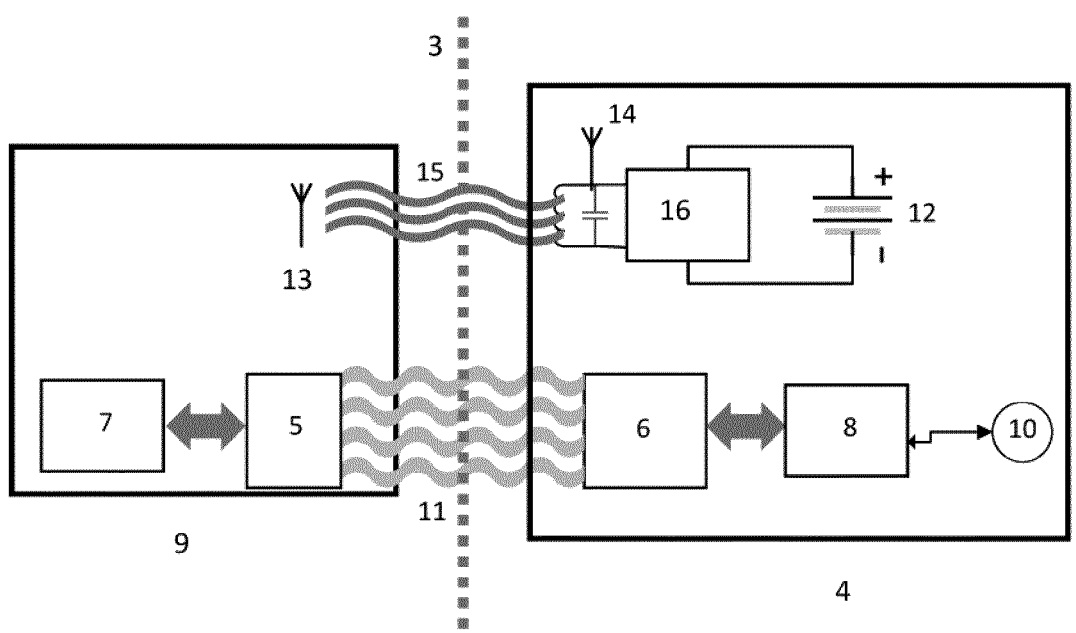
FIG. 4 is a detailed schematic representation of an electrical actuator according to a further embodiment of the invention.

FIG. 4 shows a schematic configuration according to a further embodiment of the invention, where additional power is provided to the sensor unit 4 by means of energy harvesting. Thereto, the control unit 9 in the electronics chamber 1 additionally comprises a transmitter 13, configured to transmit wireless signals 15. The sensor unit 4, located in the utility chamber 2, comprises a corresponding receiver 14, energy harvesting means 16 and battery 12. Wireless signals 15, transmitted by the transmitter 13 located in the electronics chamber 1, pass through the penetration plate 1 and into the utility chamber 2. The wireless signals are picked up by the receiver 14 of the sensor unit 4 and conveyed to the energy harvesting means 16. The energy harvesting means 16 is configured to convert the wireless signals to power and supply the power to the battery 12, to recharge the latter. Preferably, energy harvesting occurs continuously. Optionally, the sensor unit 4 may additionally comprise an amplifier and/or a DC multiplier, in order to increase the voltage of the output from the energy harvesting means 16.

As most components of the motor or gearbox components in the utility chamber 2 are made of stainless steel, the transmitted wireless signals 15 are preferably radio frequency signals. The transmitter 13 and receiver 14 are then configured to, respectively, transmit and receive radio frequency signals at the same frequencies. The frequencies utilized in the transmission of radio frequency signals are preferably adapted to the material and shape of the electronics chamber 1, the penetration plate 3 and the utility chamber 2. In this manner, energy transfer is optimized. The energy harvesting means 16 is configured to convert the received radio frequency signals to power.

In case transmission of radio frequency signals is hampered by the presence of magnetic materials, ultrasonic signals may be used as an alternative. The transmitter 13 and receiver 14 are then configured to, respectively, transmit and receive ultrasonic signals. The energy harvesting means 16 is configured to convert the received ultrasonic signals into power. In order to prevent interference with the ultrasonic data communication between the first transceiver 5 located in the electronics chamber 1 and the second transceiver 6 located in the utility chamber 2, described above, data communication and energy harvesting may be temporally alternating. In this case, energy harvesting is interrupted at predefined time intervals to allow data communication, after which energy harvesting is resumed.

In an alternative embodiment, the energy harvesting means 16 may supply the power, extracted from the received radio frequency or ultrasonic signals, to an optional back-up battery (not shown), located in the sensor unit 4. Should the battery 12 be fully charged, power from the energy harvesting means 16 may be re-routed to the back-up battery instead.

By utilizing energy harvesting, the autonomous lifetime of the sensor unit 4 can be further increased, up to 10 years or more, before battery replacement becomes necessary.

The electronical actuator according to the invention is easier to design, produce, assemble and install than known solutions, due to the absence of power wires and data wires extending between the one or more sensors and the electronics chamber. Furthermore, with sensor contact pins embedded in the penetration plate no longer being required, a thinner penetration plate as compared to actuators utilizing sensor contact pins can be utilized. Thereby weight is saved, which leads to reduced production, assembly and installation costs.

A method of controlling a valve using an actuator according to the invention is next described. One or more physical quantities in the utility chamber 2 are monitored by the at least one sensor unit 4. The physical quantities may be one or more of temperature, pressure, oil levels or ingress of seawater. Data signals resulting from the monitoring are wirelessly communicated from the at least one sensor unit 4 to the control unit 9. Based on the data signal received by the control unit 9, the valve may be controlled by the electrical actuator. The electrical actuator may, for instance, close the valve upon detection of seawater ingress by the sensor unit. The method may, for instance, be applied to control one or more valves in a subsea hydrocarbon production environment. However, the method is not limited thereto and may be applied to any electrical actuator-controlled valve.

Although the inventive electrical actuator and the method for controlling a valve have been described in detail, the embodiments described above are by no means limiting. Therefore, the foregoing is not meant to be limiting or exhaustive in any manner; specific embodiments are for illustrative purposes only and can be combined or altered as desired. Indeed, many further modifications are possible, all falling within the scope defined by the appended claims.

REFERENCE SIGNS

1 electronics chamber
2 utility chamber
3 penetration plate
3*a* contact pins
3*b* sensor contact pins
4 sensor unit
5 first transceiver
6 second transceiver
7 controller
8 digital signal processing unit
9 controller unit
10 sensor
11 wireless data communication
12 battery
13 transmitter
14 receiver
15 wireless signals
16 energy harvesting means

The invention claimed is:

1. Electrical actuator for a subsea hydrocarbon extraction valve assembly, the electrical actuator comprising:
an electronics chamber, comprising a control unit;
a utility chamber, comprising at least one sensor unit including a sensor; and
a penetration plate, separating the electronics chamber and the utility chamber; wherein
each sensor unit is configured to wirelessly communicate a data signal, obtained by the sensor, to the control unit.

2. Electrical actuator according to claim 1, wherein the control unit comprises a first transceiver and the at least one sensor unit comprises a second transceiver; the first and second transceivers being configured to wirelessly communicate a data signal therebetween.

3. Electrical actuator according to claim 2, wherein the at least one sensor unit further comprises a digital signal processing unit connected to the second transceiver and to the sensor.

4. Electrical actuator according to claim 3, wherein the digital signal processing unit is a low power digital processing unit, configured to obtain data signals from the sensor at regular time intervals and to be in sleep-mode when not obtaining data signals.

5. Electrical actuator according to claim 1, wherein the at least one sensor unit further comprises a battery, configured to supply power to the sensor, to the digital signal processing unit and to the second transceiver.

6. Electrical actuator according to claim 2, wherein the wireless data communication is an ultrasonic data communication and wherein the first and second transceivers are ultrasonic transceivers.

7. Electrical actuator according to claim 1, wherein the at least one sensor unit further comprises a receiver and an energy harvesting means coupled to the receiver.

8. Electrical actuator according to claim 7, wherein the control unit further comprises a transmitter, configured to transfer wireless signals to the receiver; and
wherein the energy harvesting means is configured to convert the wireless signals received by the receiver into power and to supply said power to the battery.

9. Electrical actuator according to claim 8, wherein the transmitter is configured to transmit one of radio frequency signals or ultrasonic signals and the receiver is configured to receive said radio frequency signals or ultrasonic signals.

10. Electrical actuator according to claim 1, wherein the at least one sensor is a pressure sensor, a temperature sensor, an oil level sensor, a seawater ingress sensor or a position sensor.

11. Electrical actuator of claim 1, wherein the electronics chamber and the utility chamber each contain one of the control unit and the sensor.

12. Valve assembly for a subsea hydrocarbon extraction environment, wherein the valve assembly is provided with an electrical actuator according to claim 1.

13. Subsea production system, comprising one or more valve assemblies according to claim 12.

14. Method of controlling a valve assembly using an electrical actuator according to claim 1, the method comprising:
monitoring one or more physical quantities in the utility chamber with the at least one sensor unit;
wirelessly communicating data signals, resulting from said monitoring, from the at least one sensor unit to the control unit; and
controlling the valve assembly based on the data signal received by the control unit.

15. Method according to claim 14, wherein the wireless communication is an ultrasonic wireless communication.

16. Method according to claim 15, wherein the control unit transfers wireless signals to the at least one sensor unit; and
wherein the at least one sensor unit converts the wireless signals into power, said power being used to operate the at least one sensor unit.

17. Method according to claim 16, wherein the wireless signals are one of radio frequency signals or ultrasonic signals.

18. Method according to claim 17, wherein the wireless signals are ultrasonic signals and wherein the transferring of ultrasonic signals by the control unit to the at least one sensor unit is temporally interrupted when the at least one sensor unit ultrasonically communicates data signals to the control unit.

19. Method according to claim 14, wherein the valve assembly is a valve assembly for a subsea hydrocarbon production environment.

20. Method of claim 14, wherein the electronics chamber and the utility chamber each contain one of the control unit and the sensor.

* * * * *